United States Patent [19]

Rainish

[11] Patent Number: 6,104,769
[45] Date of Patent: Aug. 15, 2000

[54] METHOD AND APPARATUS FOR ACQUIRING AND TRACKING THE SAMPLING PHASE OF A SIGNAL

[75] Inventor: Doron Rainish, Ramat Gan, Israel

[73] Assignee: D.S.P.C. Technologies Ltd., Givat Schmuel, Israel

[21] Appl. No.: 08/909,643

[22] Filed: Aug. 12, 1997

[30] Foreign Application Priority Data

Feb. 14, 1997 [IL] Israel ........................................ 120222

[51] Int. Cl.[7] ....................................................... H04L 7/04
[52] U.S. Cl. ........................ 375/355; 375/340; 375/343; 375/349; 375/362; 714/789; 714/796
[58] Field of Search ..................................... 375/207, 260, 375/262, 263–265, 340, 341, 343, 346, 348, 349, 355, 362, 347; 714/789, 794, 796

[56] References Cited

U.S. PATENT DOCUMENTS

| | | | |
|---|---|---|---|
| 4,914,699 | 4/1990 | Dunn et al. ................................. | 380/34 |
| 5,285,480 | 2/1994 | Chennakeshu et al. .................. | 375/348 |
| 5,297,171 | 3/1994 | Koch ......................................... | 375/347 |
| 5,420,889 | 5/1995 | Juntti ......................................... | 375/346 |
| 5,471,501 | 11/1995 | Parr et al. ................................. | 375/354 |
| 5,487,091 | 1/1996 | Jasper et al. ............................. | 375/347 |
| 5,499,272 | 3/1996 | Bottomley ................................. | 375/347 |
| 5,513,221 | 4/1996 | Parr et al. ................................. | 375/344 |
| 5,533,066 | 7/1996 | Yamaguchi et al. ..................... | 375/341 |
| 5,619,524 | 4/1997 | Ling et al. ................................ | 375/200 |
| 5,621,769 | 4/1997 | Wan et al. ................................ | 375/347 |
| 5,659,573 | 8/1997 | Bruckert et al. ......................... | 375/200 |
| 5,701,333 | 12/1997 | Okanoue et al. ......................... | 375/347 |
| 5,706,314 | 1/1998 | Davis et al. .............................. | 375/340 |
| 5,796,776 | 8/1998 | Lomp et al. ............................. | 375/222 |
| 5,796,788 | 8/1998 | Bottomley ................................ | 375/341 |
| 5,862,191 | 1/1999 | Moridi ...................................... | 375/355 |

OTHER PUBLICATIONS

Book: John G. Proakis, *Digital Communications*, 3rd Edition, McGraw–Hill, Inc., Chapter 10, pp. 583–635.

*Primary Examiner*—Young T. Tse
*Attorney, Agent, or Firm*—Skjerven, Morrill, MacPherson, Franklin & Friel LLP

[57] ABSTRACT

Apparatus for providing an optimized sampling phase to a received signal in a given channel, the received signal including inter-symbol interference. The apparatus includes a voltage controlled clock (VCC) for providing a VCC sampling phase, a first signal detector, connected to the VCC, for sampling the signal according to an advanced sampling phase which is advanced by a predetermined value δ with respect to the VCC sampling phase, thereby producing a first sampled signal, a second signal detector, connected to the VCC, for sampling the signal according to a delayed sampling phase which is delayed by a predetermined value δ with respect to the VCC sampling phase, thereby producing a second sampled signal, a first channel metric estimating unit, connected to the first signal detector, for obtaining a first estimated metric value from the first sampled signal, a second channel metric estimating unit, connected to the second signal detector, for obtaining a second estimated metric value from the second sampled signal and a subtracting unit, connected to the first channel estimating unit and to the second channel estimating unit, for subtracting the second first estimated metric value from the second estimated metric value, thereby obtaining a phase correction signal according to which, the VCC sampling phase is to be corrected.

10 Claims, 5 Drawing Sheets

METHOD AND APPARATUS FOR ACQUIRING AND TRACKING THE SAMPLING PHASE OF A SIGNAL

FIELD OF THE INVENTION

The present invention relates to a method and apparatus for managing a received and modulated signal in general and to a method and apparatus for managing a time synchronization mechanism in particular.

BACKGROUND OF THE INVENTION

Reference is now made to FIGS. 1A and 2. FIG. 1A is a prior art graphic illustration of the amplitude measurement versus time T, of a signal, generally referenced 1.

FIG. 2 is a schematic illustration of a prior art apparatus, generally referenced 20, for acquiring the accurate synchronization for a received signal.

Apparatus 20 includes a voltage controlled clock (VCC) 22, an early detector 26, for detecting the beginning section of a received signal, a late detector 24, for detecting the end section of a received signal, a metric processor 40, connected to the output of the early detector 26, a metric processor 42, connected to the output of the late detector 24, a subtracting unit 30, connected to the metric processors 40 and 42, a filtering unit 32, connected to the subtracting unit 30 and to the VCC 22 and a signal detection unit 28, connected to the VCC 22.

The early detector 26 is connected to VCC 22 via a time phase advance unit 44, which advances the clock signal provided by VCC 22, by a predetermined time period 67. The late detector 24 is connected to VCC 22 via a time phase delay unit 46 which delays the clock signal provided by VCC 22 by predetermined time period δ.

The apparatus 20 further includes an equalizing unit 34 connected to the signal detection unit 28. The equalizing unit 34 is required for processing channel signals which include inter-symbol interference, such as multipath fading channels.

In the present example, the early detector 26 of the present example includes a matched filter 54 and a sampler 36 connected therebetween, the late detector 24 includes a matched filter 56 and a sampler 38 connected therebetween and the signal detection unit 28 includes a matched filter 50 and a sampler 52 connected there between.

The object of apparatus 20 is to perform detection of a received signal.

Referring back to FIG. 1A, the accurate synchronization for the signal 1 is represented by the phase time period 2. The accurate location of phase time period 2 is unknown and therefore, has to be detected and determined. In the prior art, this is done by providing signal detectors which detect the signal in at least two time periods:

i. an early detector, such as early detector 26, which detects the received signal over a first time period 4 viewing the beginning section of the signal 1; and ii. a late detector, such as late detector 24, which detects the received signal over a second time period 6, viewing the ending section of the signal 1.

Each of the detectors 24 and 26 produces an output with a magnitude that is proportional to the portion of the signal 1 detected thereby. Detectors 24 and 26 provide their output to the metric processors 42 and 40, respectively. Metric processors 40 and 42 compute either an absolute value of this output or its square value.

When one detector detects a larger portion of the signal than the other detector, the output provided by the corresponding metric processor, connected thereto, will be higher respectively. Accordingly, the sampling phase should be shifted towards the detector which detects the least amount of signal, so as to achieve equilibrium therebetween.

In the present example, when late detector 24 detects a portion of the received signal which is larger then the one detected by the early detector 26, this indicates that the phase time period 2 is shifted to the right with respect to the original signal 1. Accordingly, the original signal 1 has to be shifted to the left.

If, on the other hand, the late detector 24 detects a smaller portion of the signal 1 than the one detected by the early detector 26, then the phase time period 2 is shifted to the left with respect to the original signal 1. Accordingly, the original signal 1 has to be shifted to the right.

In apparatus 20, early detector 26 performs a convolution of the input signal with the matched filter 54 over the beginning section of the received signal while late detector 24 performs the convolution with the matched filter 56 over the end section of the received signal. The results of these two convolutions are fed to the metric processors 40 and 42 respectively, which in turn, provide their output to subtracting unit 30. The subtracting unit 30 subtracts the output provided by metric processor 40 from the output provided by metric processor 42.

The result of the subtraction determines if the VCC 22 should operate under a new sampling phase thereby determining a new location of the phase time period 2 with respect to the original signal.

The subtracting unit 30 provides the result of the subtraction to the filtering unit 32 which modifies, accordingly, a suitable signal and provides it to the VCC 22, as feed-back. The VCC 22 adjusts the phase respectively. This operation is called a delay lock loop (DLL).

Thus, the signal detection unit 28 should be provided with a well-synchronized signal for decoding. This DLL apparatus is a simplified and efficient realization of the optimal maximum likelihood (ML) time synchronizer. Another implementation for an ML time synchronizer, known in the art, is to sample the received signal at a plurality of synchronization phases and to determine the optimal phase therefrom.

Such implementations perform very well on channels with no, or very little inter-symbol interference (ISI). For channels with high ISI, such as multipath fading channels, the performance of the prior art apparatus described hereinabove degrade considerably since ISI causes the symbol pulse shape to be smeared over a longer period of time. As a result, the output of the early and late detectors is now effected by a large number of symbols. In a multipath fading channel, the shape of the symbol pulse received at the receiver changes arbitrarily in time, according to the gains of the fading paths, so the optimal sampling phase is no longer well defined.

In channels with high ISI, detectors such as signal detecting unit 28 have a very high symbol error rate. This requires the use of an equalizer, such as equalizer 34, in order to lower the apparatus overall symbol error rate.

In many types channels, such as multipath fading channels, use of a non linear equalizer, such as a maximum likelihood sequence estimation (MLSE) equalizer or a decision feedback equalizer (DFE), results in improved performances. It should be noted that the MLSE equalizer is the optimum equalizer in terms of sequence error rate.

When using an equalizer, especially a non-linear one, the sampling phase that will result in the best equalizer performance is a complex function of the input signal. The simple metrics utilized by metric processors 40 and 42 are far from being optimal.

According to some prior art methods, the detection process is performed using additional detecting units for acquisition of other areas of the received signal, such as time periods 8 and 10 (FIG. 1A).

In a multi-path channel, a received signal includes a plurality of echoes which often overlap. It will be appreciated that it is considerably difficult to detect a conventional signal in a multi-path situation.

Reference is now made to FIG. 1B which includes three graphic illustrations, generally referenced 61A, 61B and 61C, of the amplitude measurement versus time T of a signal, generally referenced 63.

Signal 63 includes transmitted symbols 60, 62 and 64 traveling through a channel 66. Channel 66 represents the various paths, often caused by reflections from various objects, through which each transmitted symbol may travel. These reflections determine the channel impulse response 68 of channel 66. Thus, channel 66 influences each of the symbols 60, 62 and 64, according to channel impulse response 68, so as to produce received symbols 70, 72 and 74 respectively. Each received symbol is the result of a convolution between the respective transmitted symbol and the channel impulse response.

The received signal 76 is a summation of received symbols 70, 72 and 74. The received signal 76 is received by a receiver and is provided to apparatus 20 for processing. It will be noted that the received symbol 76 may also include noise.

Channel taps correspond to the effect of neighboring received symbols on the current received sample. For example, the value of a sample $s_i$ sampled at the output of the receive filter, is given by $$s_i = \sum_{n=-L_1}^{L_2} h_n a_{i-n}$$

wherein the ai are the transmitted symbols $(-\infty < i < \infty)$; and $h_n$ are the gains of the channel taps $(-L_1 \leq n \leq L_2)$. $L_1$ and $L_2$ define the length of channel memory which, in turn, defines the number of neighboring symbols which affect each sample.

U.S. Pat. No. 5,533,066 describes a method which attempts to provide an accurate estimation of a maximum likelihood sequence using detection of the signal at a plurality M of points using a metric which relates to the bits of data provided by the signal detection unit 28.

SUMMARY OF THE PRESENT INVENTION

It is an object of the present invention to provide a novel method and apparatus for acquiring and tracking the sampling phase of a signal with inter-symbol interference.

In accordance with the present invention, there is thus provided apparatus for providing an optimized sampling phase to a received signal in a given channel, the received signal including inter-symbol interference. The apparatus includes a voltage controlled clock (VCC) for providing a VCC sampling phase, a first signal detector, connected to the VCC, for sampling the signal according to an advanced sampling phase which is advanced by a predetermined value δ with respect to the VCC sampling phase, thereby producing a first sampled signal, a second signal detector, connected to the VCC, for sampling the signal according to a delayed sampling phase which is delayed by a predetermined value δ with respect to the VCC sampling phase, thereby producing a second sampled signal, a first channel metric estimating unit, connected to the first signal detector, for obtaining a first estimated metric value from the first sampled signal, a second channel metric estimating unit, connected to the second signal detector, for obtaining a second estimated metric value from the second sampled signal and a subtracting unit, connected to the first channel estimating unit and to the second channel estimating unit, for subtracting the second first estimated metric value from the second estimated metric value, thereby obtaining a phase correction signal according to which, the VCC sampling phase is to be corrected.

The first and second estimated metric values are selected from the group consisting of: a symbol-error-rate, a bit-error-rate, a cut-off-rate, a channel capacity and the like.

The apparatus may further include a filtering unit, connected between the subtracting unit and the VCC for filtering the phase correction signal and providing it to the VCC.

The apparatus according to the invention may further include a signal detecting unit connected to the VCC, for detecting the received signal, thereby obtaining a plurality of samples.

The apparatus may also further include an equalizing unit connected to the signal detecting unit, for detecting symbols contained in the samples thereby producing detected symbol decisions and a decoder, connected to the equalizing unit, for decoding the received coded signal according to the detected symbol decisions.

Each the detected symbols may include quality.

According to one aspect of the invention the estimated metric value defines a metric selected from the group consisting of:

$$-K_{\delta_{min}} Q\left(\sqrt{\frac{6}{M^2-1} \cdot \frac{E_s}{N_o} \delta_{min}^2}\right);$$

$$-Q\left(\sqrt{\frac{6}{M^2-1} \cdot \frac{E_s}{N_o}}\right);$$

$$-\frac{1}{\sqrt{k}} e^{-\frac{k}{2}};$$

$$-e^{-\frac{k}{2}};$$

$$-Q(\sqrt{E_s \cdot \gamma_\infty});$$

$$-\log_2\left(1 + (M-1)e^{-\frac{E_s}{N_o}}\right); \text{ and}$$

$$-e^{-\frac{E_s}{N_o}}.$$

According to another aspect on the invention, there is thus provided a method for operating a system for acquiring and tracking the sampling phase of a received signal, the received signal being sampled according to a signal sampling phase, the received signal including a plurality of symbols, the system including an equalizer operating on the received sampled signal and a error correction decoder for decoding the processed signal, there is claimed a method for acquiring and tracking an optimized sampling phase. the method includes the steps of:

a. detecting the received signal in at least two sampling phases, thereby obtaining a sampled signal for each the sampling phases;

b. for each the sampled signal, estimating a estimated metric error rate value at the equalizer output;

c. adjusting the signal sampling phase according to the estimated metric error rate values; and d. adjusting the sampling phases according to the estimated metric error rate values.

Each sampled signal may include at least one sample. Each the sample may be a representation of an estimated symbol. The estimated metric rate value defines a metric selected from the group consisting of:

$$-K_{\delta_{min}} Q\left(\sqrt{\frac{6}{M^2-1} \cdot \frac{E_s}{N_o} \delta_{min}^2}\right);$$

$$-Q\left(\sqrt{\frac{6}{M^2-1} \cdot \frac{E_s}{N_o}}\right);$$

$$-\frac{1}{\sqrt{k}} e^{-\frac{k}{2}};$$

$$-e^{-\frac{k}{2}};$$

$$-Q(\sqrt{E_s \cdot \gamma_\infty});$$

$$-\log_2\left(1 + (M-1)e^{-\frac{E_s}{N_o}}\right); \text{ and}$$

$$-e^{-\frac{E_s}{N_o}}.$$

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The method of the present invention overcomes the disadvantages of the prior art by adjusting the sampling phase according to a metric which corresponds to the output quality of the equalizing unit of the apparatus.

Figure 1A:
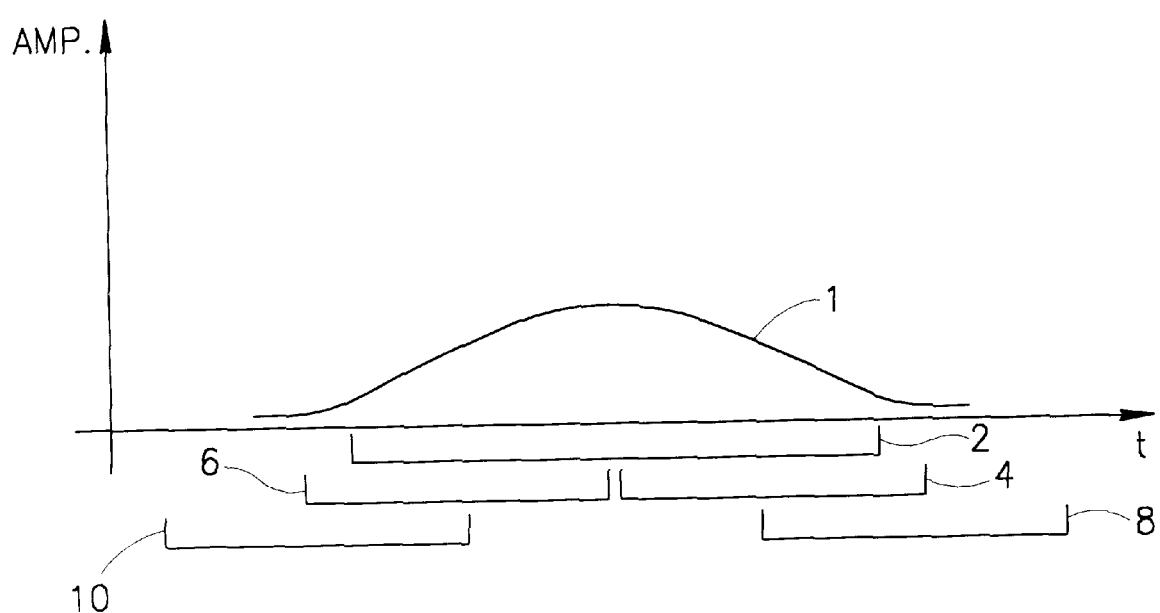
FIG. 1A is a prior art graphic illustration of the amplitude measurement versus time T, of a signal.
Figure 1B:
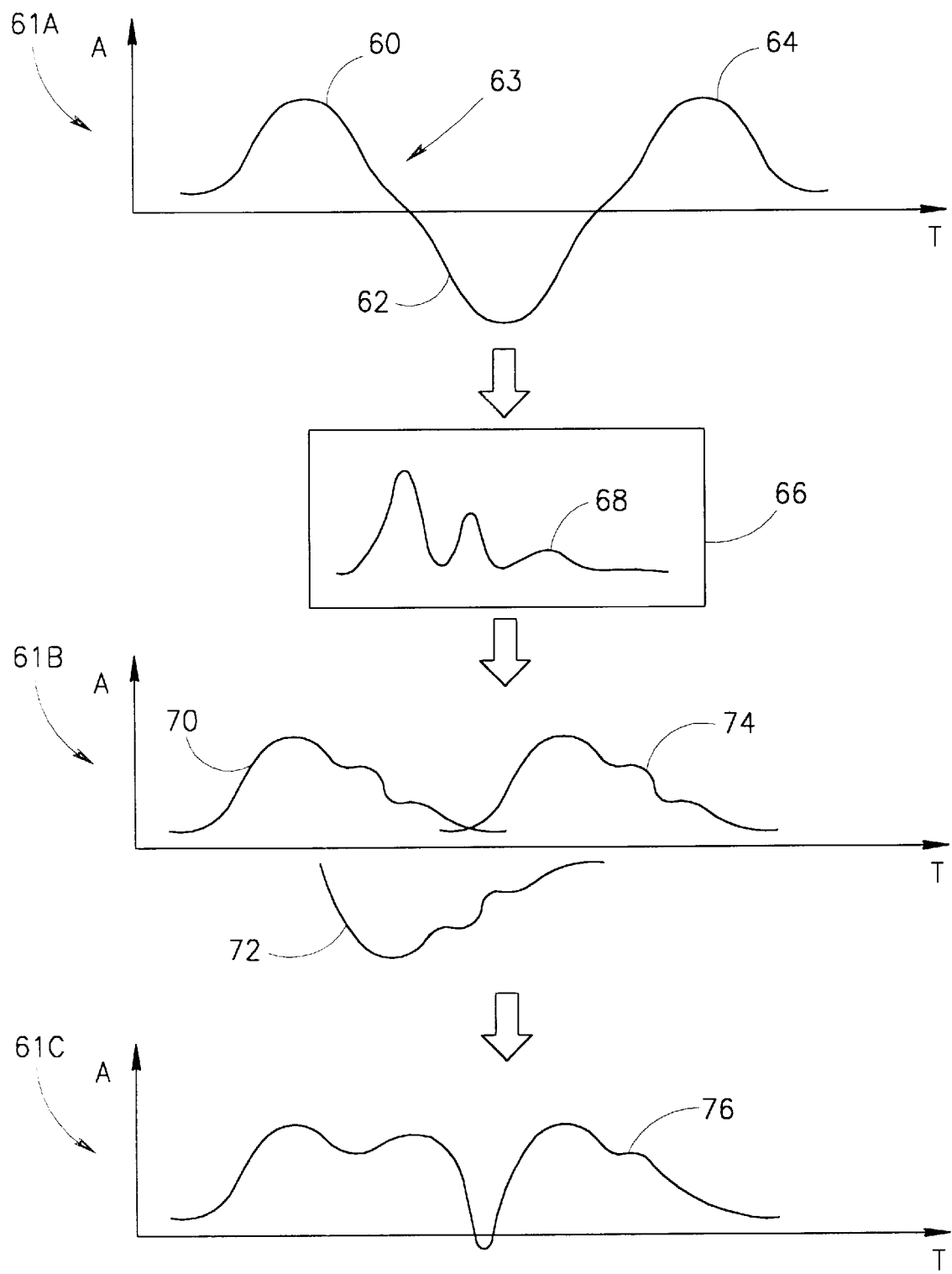
FIG. 1B includes three graphic illustrations, of the amplitude measurement versus time T of a signal.
Figure 2:
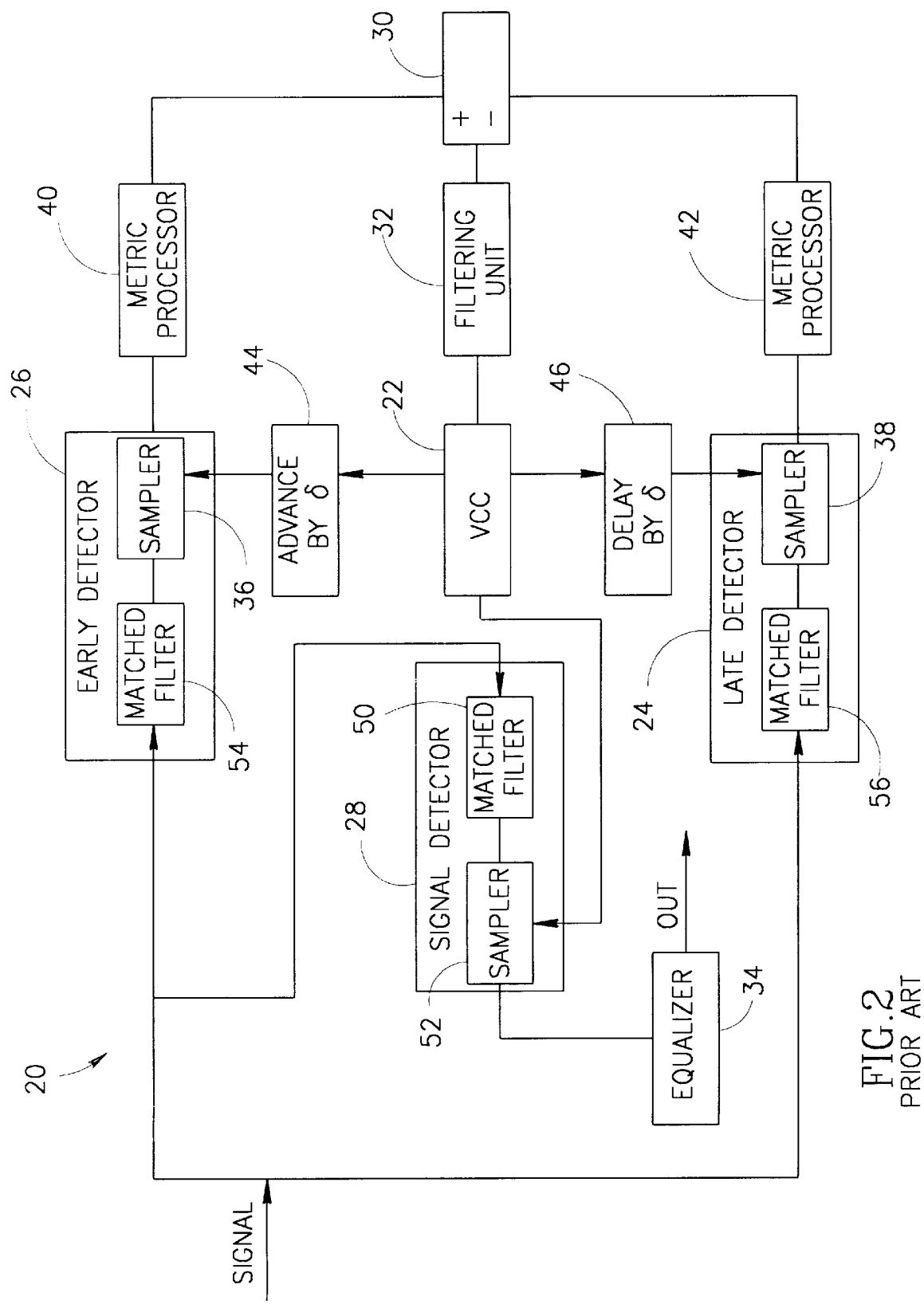
FIG. 2 is a schematic illustration of a prior art apparatus for detecting the accurate synchronization for a received signal.
Figure 3:
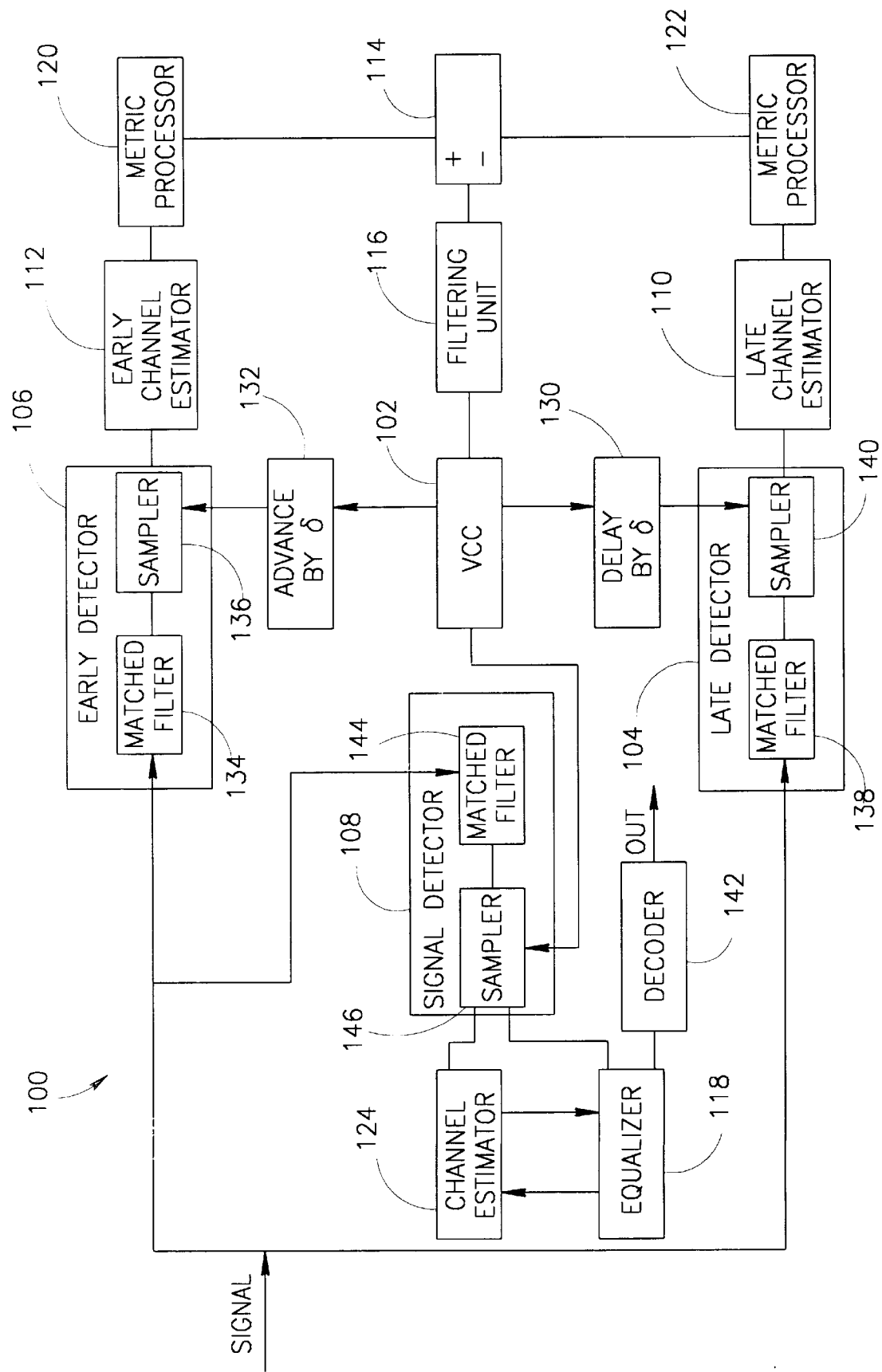
FIG. 3 is a schematic illustration of an apparatus for detecting the accurate synchronization for a received signal, constructed and operative according to a preferred embodiment of the present invention.

Reference is now made to FIG. 3 which is a schematic illustration of an apparatus, generally referenced 100, constructed and operative according to a preferred embodiment of the present invention.

Apparatus 100 includes a VCC 102, an early detector 106, detecting the beginning section of a received signal, a late detector 104, detecting the end section of a received signal, a late channel estimating unit 110, an early channel estimating unit 112, a metric processor 122 connected to the late channel estimating unit 110, a metric processor 120 connected to the early channel estimating unit 112, a subtracting unit 114, connected to both metric processors 120 and 122, and a filtering unit 116, connected to the subtracting unit 114 and to the VCC 102.

Apparatus 100 further includes a signal detection unit 108, a channel estimating unit 124, an equalizing unit 118 and a decoding unit 142.

In the present example, the early detector 106 of the present example includes a matched filter 134 and a sampler 136 connected to matched filter 134, the late detector 130 includes a matched filter 138 and a sampler 140 connected to matched filter 138 and the signal detection unit 108 includes a matched filter 144 and a sampler 146 connected to matched filter 144.

The VCC 102 is connected to sampler 136 via a time phase advance unit 132 which advances the clock signal provided by VCC 102 by a predetermined time period $\delta$. The VCC 102 is also connected to sampler 140 via a time phase delay unit 130 which delays the clock signal provided by VCC 102 by a predetermined time period $\delta$. Furthermore, the VCC 102 is connected to sampler 146.

Early channel estimating unit 112 is connected to sampler 136 and to metric processing unit 120. Late channel estimating unit 110 is connected to sampler 140 and to metric processing unit 122. Subtracting unit 114 is connected to metric processing units 120 and 122 and to filtering unit 116 which is further connected to VCC 102.

The received signal is detected by matched filters 134, 138 and 144 which filter it according to known symbols and provide it to their respective samplers 136, 140 and 146. The VCC 102 provides a sampling phase to phase advance unit 132, phase delay unit 130 and to sampler 146. Phase advance unit 132 advances the sampling phase by $\delta$ and provides it to sampler 136. Phase delay unit 130 delays the sampling phase by $\delta$ and provides it to sampler 140. Each of the samplers 136, 140 and 146 samples the filtered signal according to the sampling phase provided thereto. Samplers 136 and 140 provide their sampled signal to channel estimating units 112 and 110, respectively. Sampler 146 provides its sampled signal to channel estimation 124.

Each of the channel estimating units 110 and 112 performs the following operations:

determining an estimation of the (complex) gain of all taps; and determining an estimation of the noise power spectral density $N_o$ of the channel (if necessary for metric calculations).

Then, each of the channel estimating units 112 and 110 provides its estimation results to the metric processing units 120 and 122 connected thereto.

Each of the metric processing units 120 and 122 calculates a metric that relates to the output of equalizer 118. The equalizer 118 performance is usually measured by a symbol error rate or a sequence error rate. In some cases, the output of the equalizer 118 is fed to a decoder 142 using soft or hard decisions. A hard decision determines a symbol while a soft decision determines the symbol as well as the quality of the detection.

In these cases, the cut-off rate of the channel may serve as a quality criterion for the equalizer 118 output. All of the above mentioned performance estimations are based on the gains of the channel taps and the noise which, for this purpose, is estimated by the channel estimating units 110 and 112.

Generally, one can estimate the performance of the equalizer 118 for each possible sampling point, at a plurality of N sampling points, by estimating the channel, calculating the metric at each point and then, determining the optimal sampling phase therefrom. Alternatively, the early-late mechanism can be utilized with two separate metric calculations only. It will be noted that sampling according to a plurality of sampling phases is most suitable for acquiring an estimation of the initial value of the optimal sampling phase.

Specific performance estimations for given gains of channel taps and noise of a predetermined equalizer type can be found in the literature (e.g. the book *Digital Communications* by John G. Proakis, $3^{rd}$ edition, Chap. 10, which book is incorporated herein by reference). The general form of a symbol error rate approximation for an MLSE equalizer is given by:

$$P_M \approx K_{\delta_{min}} Q\left(\sqrt{\frac{6}{M^2-1} \cdot \frac{E_s}{N_o} \delta_{min}^2}\right)$$

where $$E_s = \sum_{n=-L_1}^{L_2} |h_n|^2$$

is the total energy of the received symbol, Q is defined as $$Q(x) = \frac{1}{\sqrt{2\pi}} \int_x^\infty e^{-\frac{x}{2}} dx$$

M is the transmitted symbol alphabet size, $K_{\delta min}$ and $\delta_{min}$ are functions of the gains of the taps and the type of modulation utilized. $K_{\delta min}$ approximates the number of times the most probable error event will happen while $E_s/N_o \delta^2_{min}$ is the signal to noise ratio corresponding to this event. A metric for pulse amplitude modulation (PAM) and rectangular quadrature amplitude modulation (QAM) is given by $$\text{metric} \propto -P_M = -K_{\delta_{min}} Q\left(\sqrt{\frac{6}{M^2-1} \cdot \frac{E_s}{N_o} \delta_{min}^2}\right)$$

where $K_{\delta min}$ and $\delta_{min}$ are calculated by the metric processors.

In a simplified example, for two equal gains of taps and transmitted symbols of alphabet cardinality (size) M, we have $\delta^2_{min}=1$ and $K_{\delta min}=2M(M-1)$. The symbol error rate $P_M$ of such a two tap MLSE equalizer is approximated by $$P_M \approx 2M(M-1)Q\left(\sqrt{\frac{6}{M^2-1} \cdot \frac{E_s}{N_o}}\right)$$

where $N_o$ is the noise power spectral density and Q is defined as $$Q(x) = \frac{1}{\sqrt{2\pi}} \int_x^\infty e^{-\frac{x}{2}} dx$$

The metric in this case simplifies to $$\text{metric} \propto -P_M = -Q\left(\sqrt{\frac{6}{M^2-1} \cdot \frac{E_s}{N_o}}\right)$$

A very useful approximation which is suitable for most types of equalizers and for any gains of taps is based on a matched filter boundary and is given by $$\text{metric} = -Q\left(\sqrt{\frac{6}{M^2-1} \cdot \frac{E_s}{N_o}}\right)$$

where $E_s$ and $N_o$ are estimated by the channel estimating units. This can be further simplified to be $$\text{metric} = -\frac{1}{\sqrt{k}} e^{-\frac{k}{2}}$$

where $$k = \frac{6}{M^2-1} \cdot \frac{E_s}{N_o}$$

This metric can be further simplified (at high $E_s/N_o$) to be $$\text{metric} = -e^{-\frac{k}{2}}$$

For DFE, an approximation of the symbol error rate is given by (*Digital Communications* by John G. Proakis, $3^{rd}$ edition, Chap. 10)

$$P_M \approx K_M Q(\sqrt{E_s \cdot \gamma_\infty})$$

where $K_M$ is a function of the modulation and $\gamma_\infty$, is a function of the channel taps, $N_o$ and the equalizer parameters. $E_s \gamma_\infty$ is an approximation of the output SNR of the DFE equalizer.

It will be noted that the method of the present invention may have early-late implementations, as described hereinabove, wherein one is subtracted from the other. Alternatively, other implementations can include processing a plurality of samples, each according to a different phase. In all of these implementations, the multiplication constants, such as $K_M$, can be omitted. In the above mentioned DFE case the metric is defined as:

$$\text{metric} = -Q(\sqrt{E_s \cdot \gamma_\infty})$$

When error control coding is used, the cut-off rate may serve as a quality criterion. The cut-off rate of a channel is a bound on the maximal data rate that the channel is able to support. For example, for phase shift keying (PSK) with alphabet size M (MPSK) modulation the cut-off rate can be approximated as $$\text{metric} = R_o \log_2(M) - \log_2\left(1 + (M-1)e^{-\frac{E_s}{N_o}}\right)$$

Omitting constants as well as constant additions such as $\log_2(M)$, the above metric results in $$\text{metric} = -\log_2\left(1 + (M-1)e^{-\frac{E_s}{N_o}}\right)$$

which can further be approximated (for high $E_s/N_o$), again omitting constants, as $$\text{metric} = -e^{-\frac{E_s}{N_o}}$$

This expression is very similar to the simplified metric for the uncoded case.

According to a preferred aspect of the invention, each of the metric processing units 120 and 122 performs the following operations:

determining the total symbol energy $E_S$; and calculating a metric which corresponds to the quality of the output of the equalizing unit.

Figure 4:
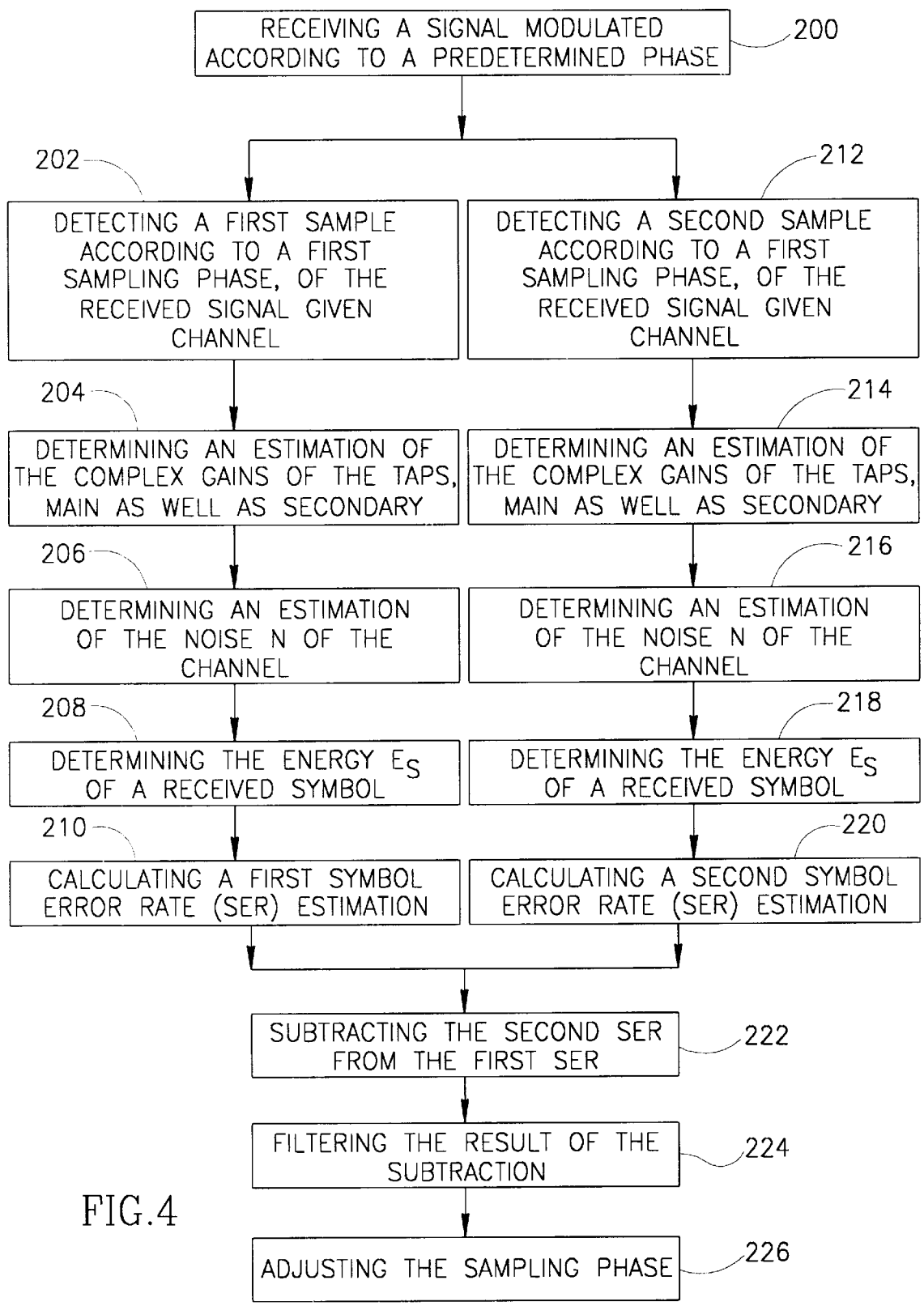
FIG. 4 is a schematic illustrating of a method for managing a DLL apparatus, so as to provide an optimized DLL, operative according to another preferred embodiment of the present invention.

Reference is now made to FIG. 4 which is a schematic illustration of a method for managing apparatus 100 so as to provide an optimized DLL, operative according to another preferred embodiment of the present invention.

In step 200, the apparatus 100 receives a signal in a given channel, modulates it according to a predetermined sampling phase and proceeds, simultaneously, to steps 202 and 212.

In step 202, the apparatus 100 detects the received signal according to a first sampling phase, which is advanced relative to the above predetermined sampling phase by a predetermined value δ. Apparatus 100 then proceeds to step 204.

In step 204, the apparatus 100 determines an estimation of the complex gains of the channel taps, sampled according to the first sampling phase. Then, the apparatus proceeds to step 206.

In step 206, the apparatus 100 determines an estimation of the noise power spectral density of the channel that corresponds to the first sampling phase and proceeds to step 208.

In step 208, the apparatus 100 determines the energy $E_S$ of the received symbols of the channel that corresponds to the first sampling phase and proceeds to step 210.

In step 210, the apparatus 100 calculates an estimation first symbol-error-rate (SER) expression, thereby determining a SER value which corresponds to the first predetermined sampling phase. The apparatus then proceeds to step 222.

Returning to step 212, the apparatus 100 detects the received signal according to a second sampling phase, which is delayed relative to the above predetermined sampling phase by a predetermined value δ. The apparatus then proceeds to step 214.

In step 214, the apparatus 100 determines an estimation of the complex gains of the channel taps, sampled according to the second sampling phase. Then, the apparatus proceeds to step 216.

In step 216, the apparatus 100 determines an estimation of the noise power spectral density of the channel that corresponds to the second sampling phase and proceeds to step 218.

In step 218, the apparatus 100 determines the energy $E_S$ of the received symbols of the channel that corresponds to the second sampling phase and then proceeds to step 220.

In step 220, the apparatus 100 calculates an estimation second SER expression, thereby determining an SER value which corresponds to the second predetermined sampling phase and proceeds to step 222.

In step 222, the apparatus 100 subtracts the SER value of the second sample of the signal (output of step 220) from the SER value of the first sample of the signal (output of step 210) and proceeds to step 224.

In step 224, the apparatus 100 filters the result of the subtraction of step 222 and proceeds to step 226.

In step 226, the apparatus 100 adjusts the sampling phase according to the filtered result of step 222 and repeats steps 200–226.

It is noted that while the above example relates to a dual sampling point architecture, the method according to the invention can be implemented in a multiple sampling point architecture, by repeating steps 202–210 for each sampling point and choosing the lowest symbol-error-rate provided therefrom.

It will be appreciated that while conventional methods relate to the "raw" processed signal (i.e. prior to the equalizer), the present invention utilizes an approach which corresponds to the final "client" of the detection procedure, i.e. the equalizing unit, the decoding unit and the like. For example, a bit-error-rate, a symbol-error-rate, a cut-off-rate, a channel capacity, a combination of the above and the like, may be utilized in the process of determining the accurate sampling phase.

It will be appreciated by persons skilled in the art that the present invention is not limited to what has been particularly shown and described hereinabove. Rather the scope of the present invention is defined only by the claims which follow.

This invention claimed is:

1. Apparatus for providing an optimized sampling phase to a received signal in a given channel, the apparatus comprising:

a. a sampling phase controller for providing a sampling phase;

b. a first signal detector, connected to said sampling phase controller, for sampling said signal according to an advanced sampling phase which is advanced by a predetermined value δ with respect to said sampling phase, thereby producing a first sampled signal;

c. a second signal detector, connected to said sampling phase controller, for sampling said signal according to a delayed sampling phase which is delayed by said predetermined value δ with respect to said sampling phase, thereby producing a second sampled signal;

d. a third signal detector connected to said sampling phase controller for sampling said signal according to said sampling phase, thereby producing a third sampled signal;

e. an information detector conneted to said third signal detector for detecting information Present within said third sampled signal;

f. a first channel metric estimating unit, connected to said first signal detector, for obtaining a first estimated metric value which estimates the quality of output which said information detector would provide if said third signal detector operates with said advanced sampling phase;

g. a second channel metric estimating unit, connected to said second signal detector, for obtaining a second estimated metric value which estimates the quality of output which said information detector would provide if said third signal detector operates with said delayed sampling phase; and h. a subtracting unit, connected to said first channel metric estimating unit and to said second channel metric estimating unit, for subtracting said first estimated metric value from said second estimated metric value, thereby obtaining a phase correction signal according to which said sampling phase is to be corrected.

2. Apparatus according to claim 1 wherein said first and second estimated metric values are selected from the group consisting of.

a. a symbol-error-rate;
b. a bit-error-rate;
c. a cut-off-rate;
d. a channel capacity; and
e. a sequence-error-rate.

3. Apparatus according to claim 1 further comprising a filtering unit, connected between said subtracting unit and said sampling phase controller for filtering said phase correction signal and providing it to said sampling phase controller.

4. Apparatus according to claim 1 wherein said first and second estimated metric values define a metric selected from the group consisting of:

a. $-K_{\delta_{min}} Q\left(\sqrt{\dfrac{6}{M^2-1} \cdot \dfrac{E_s}{N_o} \delta_{min}^2}\right)$;

b. $-Q\left(\sqrt{\dfrac{6}{M^2-1} \cdot \dfrac{E_s}{N_o}}\right)$;

c. $-\dfrac{1}{\sqrt{k}} e^{-\frac{k}{2}}$;

d. $-e^{-\frac{k}{2}}$;

e. $-Q(\sqrt{E_s \cdot \gamma_\infty})$;

f. $-\log_2\left(1+(M-1)e^{-\frac{E_s}{N_o}}\right)$; and g. $-e^{-\frac{E_s}{N_o}}$.

5. Apparatus according to claim 1, wherein said information detector is selected from the group consisting of: an equalizer, a decoder and an equalizer followed by a decoder.

6. In a system for acquiring and tracking the sampling phase of a received signal, the received signal being sampled according to a signal sampling phase, the received signal including a plurality of symbols, the system including an information detector operating on the received sampled signal, a method for acquiring and tracking an optimized sampling phase, the method comprising the steps of:

a. sampling said received signal in at least two sampling phases, thereby obtaining a sampled signal for each of said at least two sampling phases;

b. for each said sampled signal, estimating an estimated metric value which estimates the quality of output from said information detector;

c. adjusting said signal sampling phase according to said estimated metric values; and d. adjusting said at least two sampling phases according to said estimated metric values.

7. A method according to claim 6 wherein each said sampled signal comprises at least one sample.

8. A method according to claim 7 wherein each said sample is a representation of an estimated symbol.

9. A method according to claim 8 wherein said estimated metric value defines a metric selected from the group consisting of:

a. $-K_{\delta_{min}} Q\left(\sqrt{\dfrac{6}{M^2-1} \cdot \dfrac{E_s}{N_o} \delta_{min}^2}\right)$;

b. $-Q\left(\sqrt{\dfrac{6}{M^2-1} \cdot \dfrac{E_s}{N_o}}\right)$;

c. $-\dfrac{1}{\sqrt{k}} e^{-\frac{k}{2}}$;

d. $-e^{-\frac{k}{2}}$;

e. $-Q(\sqrt{E_s \cdot \gamma_\infty})$;

f. $-\log_2\left(1+(M-1)e^{-\frac{E_s}{N_o}}\right)$; and g. $-e^{-\frac{E_s}{N_o}}$.

10. A method according to claim 6, wherein said information detector is selected from the group consisting of: an equalizer, a decoder and an equalizer followed by a decoder.

* * * * *

UNITED STATES PATENT AND TRADEMARK OFFICE
CERTIFICATE OF CORRECTION

PATENT NO.   : 6,104,769
DATED        : August 15, 2000
INVENTOR(S)  : Doron Rainish It is certified that error appears in the above-identified patent and that said Letters Patent is hereby corrected as shown below:

The title page should be deleted to appear as per attached title page.

The sheet of drawings consisting of figure 4, should be deleted to appear as per attached figure 4.

Signed and Sealed this

Eighteenth Day of February, 2003

JAMES E. ROGAN
*Director of the United States Patent and Trademark Office*

United States Patent [19]
Rainish

[11] Patent Number: 6,104,769
[45] Date of Patent: Aug. 15, 2000

[54] METHOD AND APPARATUS FOR ACQUIRING AND TRACKING THE SAMPLING PHASE OF A SIGNAL

[75] Inventor: Doron Rainish, Ramat Gan, Israel

[73] Assignee: D.S.P.C. Technologies Ltd., Givat Schmuel, Israel

[21] Appl. No.: 08/909,643

[22] Filed: Aug. 12, 1997

[30] Foreign Application Priority Data

Feb. 14, 1997 [IL] Israel ......................................... 120222

[51] Int. Cl.[7] ....................................................... H04L 7/04
[52] U.S. Cl. .......................... 375/355; 375/340; 375/343; 375/349; 375/362; 714/789; 714/796
[58] Field of Search ....................... 375/207, 260, 375/262, 263–265, 340, 341, 343, 346, 348, 349, 355, 362, 347; 714/789, 794, 796

[56] References Cited

U.S. PATENT DOCUMENTS

| | | | |
|---|---|---|---|
| 4,914,699 | 4/1990 | Dunn et al. | 380/34 |
| 5,285,480 | 2/1994 | Chennakeshu et al. | 375/348 |
| 5,297,171 | 3/1994 | Koch | 375/347 |
| 5,420,889 | 5/1995 | Juntti | 375/346 |
| 5,471,501 | 11/1995 | Parr et al. | 375/354 |
| 5,487,091 | 1/1996 | Jasper et al. | 375/347 |
| 5,499,272 | 3/1996 | Bottomley | 375/347 |
| 5,513,221 | 4/1996 | Parr et al. | 375/344 |
| 5,533,066 | 7/1996 | Yamaguchi et al. | 375/341 |
| 5,619,524 | 4/1997 | Ling et al. | 375/200 |
| 5,621,769 | 4/1997 | Wan et al. | 375/347 |
| 5,659,573 | 8/1997 | Bruckert et al. | 375/200 |
| 5,701,333 | 12/1997 | Okanoue et al. | 375/347 |
| 706,314 | 1/1998 | Davis et al. | 375/340 |
| 5,796,776 | 8/1998 | Lomp et al. | 375/222 |
| 5,796,788 | 8/1998 | Bottomley | 375/341 |
| 5,862,191 | 1/1999 | Moridi | 375/355 |

OTHER PUBLICATIONS

Book: John G. Proakis, *Digital Communications*, 3rd Edition, McGraw-Hill, Inc., Chapter 10, pp. 583–635.

*Primary Examiner*—Young T. Tse
*Attorney, Agent, or Firm*—Skjerven, Morrill, MacPherson, Franklin & Friel LLP

[57] ABSTRACT

Apparatus for providing an optimized sampling phase to a received signal in a given channel, the received signal including inter-symbol interference. The apparatus includes a voltage controlled clock (VCC) for providing a VCC sampling phase, a first signal detector, connected to the VCC, for sampling the signal according to an advanced sampling phase which is advanced by a predetermined value δ with respect to the VCC sampling phase, thereby producing a first sampled signal, a second signal detector, connected to the VCC, for sampling the signal according to a delayed sampling phase which is delayed by a predetermined value δ with respect to the VCC sampling phase, thereby producing a second sampled signal, a first channel metric estimating unit, connected to the first signal detector, for obtaining a first estimated metric value from the first sampled signal, a second channel metric estimating unit, connected to the second signal detector, for obtaining a second estimated metric value from the second sampled signal and a subtracting unit, connected to the first channel estimating unit and to the second channel estimating unit, for subtracting the second first estimated metric value from the second estimated metric value, thereby obtaining a phase correction signal according to which, the VCC sampling phase is to be corrected.

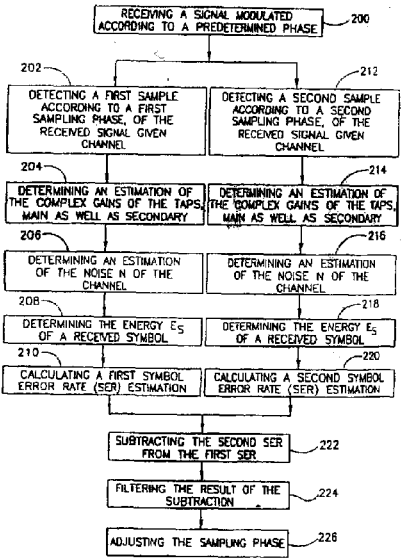

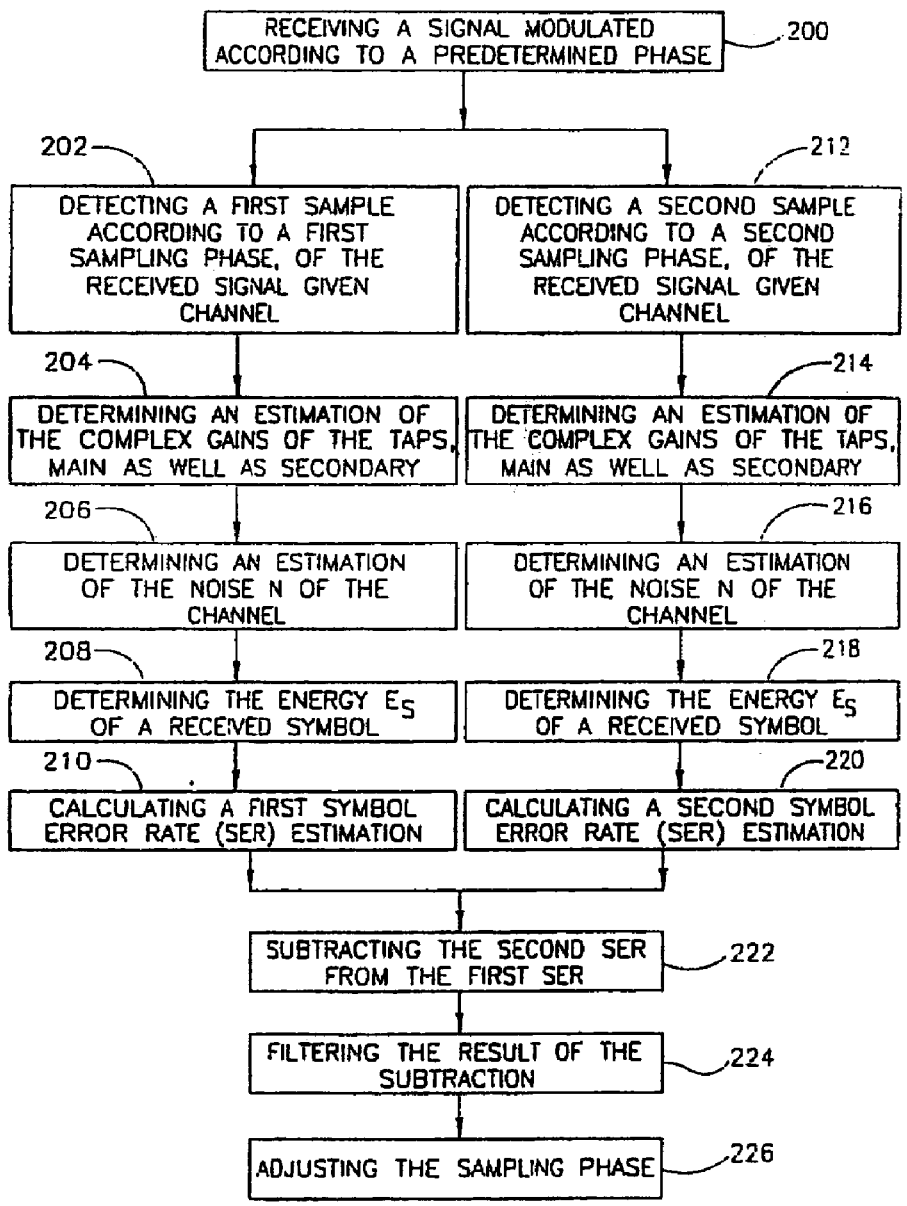

10 Claims, 5 Drawing Sheets